(12) United States Patent
Ballard et al.

(10) Patent No.: US 7,519,558 B2
(45) Date of Patent: Apr. 14, 2009

(54) BIOMETRICALLY ENABLED PRIVATE SECURE INFORMATION REPOSITORY

(76) Inventors: Claudio R. Ballard, 16 W. Neck Ct., Lloyd Harbor, NY (US) 11743; Amarish Pathak, 7 Apple Blossom La., East Patchogue, NY (US) 11772; Michael T. Imbruce, 291 E. Woodale Ave., East Patchogue, NY (US) 11772; Edward H. Currie, 6-57 158th St., Whitestone, NY (US) 11357; James Cassata, 263 Old Commack Rd., Kings Park, NY (US) 11754; Maurice N. Freedman, 528A 5th St., East Northport, NY (US) 11731

(*) Notice: Subject to any disclaimer, the term of this patent is extended or adjusted under 35 U.S.C. 154(b) by 1022 days.

(21) Appl. No.: 10/245,232

(22) Filed: Sep. 17, 2002

(65) Prior Publication Data

US 2003/0225693 A1    Dec. 4, 2003

Related U.S. Application Data

(60) Continuation-in-part of application No. 09/454,492, filed on Dec. 6, 1999, which is a division of application No. 09/081,012, filed on May 19, 1998, now Pat. No. 6,032,137, which is a continuation-in-part of application No. 08/917,761, filed on Aug. 27, 1997, now Pat. No. 5,910,988.

(60) Provisional application No. 60/323,159, filed on Sep. 18, 2001.

(51) Int. Cl.
*H04K 1/00* (2006.01)
*H04L 9/00* (2006.01)

(52) U.S. Cl. .................. 705/50; 705/51; 705/52; 705/53; 705/54; 705/55; 705/56; 705/57; 705/58; 705/59

(58) Field of Classification Search ............ 705/43, 705/64, 67, 50–59; 713/153, 176; 380/251; 382/115

See application file for complete search history.

(56) References Cited

U.S. PATENT DOCUMENTS

| 4,201,978 A | 5/1980 | Nally |
| 4,264,808 A | 4/1981 | Owens et al. |
| 4,326,258 A | 4/1982 | de la Guardia |

(Continued)

*Primary Examiner*—Salvatore Cangialosi
*Assistant Examiner*—Cristina Owen Sher
(74) *Attorney, Agent, or Firm*—Anderson, Levine & Lintel; Rodney M. Anderson

(57) ABSTRACT

A system for remote data acquisition and private and secure and authenticated, centralized processing and storage is disclosed called the DataTreasury™ Repository System. The DataTreasury™ Repository System provides a secure system for the storage and retrieval of data comprising personal information, financial information, and general information. The identity of the users are held private through the use of a biometric as the sole personal identifier. The system acquires transactional data at at least one remote locations, encrypts the data, transmits the encrypted data to a central location, transforms the data to a usable form, performs identification verification using biometric data, generates informative reports from the data and transmits the informative reports to the remote location(s), while maintaining privacy, security, and authenticity of the user's data and biometric. To ensure the complete security of the system, all data is re-encrypted while in storage, or when it is in a state of nonuse.

15 Claims, 7 Drawing Sheets

U.S. PATENT DOCUMENTS

| | | | |
|---|---|---|---|
| 4,417,136 A | 11/1983 | Rushby et al. | |
| 4,457,015 A | 6/1984 | Nally et al. | |
| 4,500,750 A | 2/1985 | Elander et al. | |
| 4,523,330 A | 6/1985 | Cain | |
| 4,555,617 A | 11/1985 | Brooks et al. | |
| 4,578,530 A | 3/1986 | Zeidler | |
| 4,680,803 A | 7/1987 | Dilella | |
| 4,694,147 A | 9/1987 | Amemiya et al. | |
| 4,747,058 A | 5/1988 | Ho | |
| 4,750,201 A | 6/1988 | Hodgson et al. | |
| 4,843,220 A | 6/1989 | Haun | |
| 4,858,121 A | 8/1989 | Barber et al. | |
| 4,888,812 A | 12/1989 | Dinan et al. | |
| 4,912,762 A | 3/1990 | Lee et al. | |
| 4,926,325 A | 5/1990 | Benton et al. | |
| 4,960,981 A | 10/1990 | Benton et al. | |
| 5,091,968 A | 2/1992 | Higgins et al. | |
| 5,122,950 A | 6/1992 | Benton et al. | |
| 5,144,115 A | 9/1992 | Yoshida | |
| 5,159,548 A | 10/1992 | Caslavka | |
| 5,173,594 A | 12/1992 | McClure | |
| 5,175,682 A | 12/1992 | Higashiyama et al. | |
| 5,187,750 A | 2/1993 | Behera | |
| 5,204,811 A | 4/1993 | Bednar et al. | |
| 5,220,501 A | 6/1993 | Lawlor et al. | |
| 5,237,158 A | 8/1993 | Kern et al. | |
| 5,274,567 A | 12/1993 | Kallin et al. | |
| 5,283,829 A | 2/1994 | Anderson | |
| 5,321,238 A | 6/1994 | Kamata et al. | |
| 5,321,751 A | 6/1994 | Ray et al. | |
| 5,326,959 A | 7/1994 | Perazza | |
| 5,345,090 A | 9/1994 | Hludzinski | |
| 5,434,928 A | 7/1995 | Wagner | |
| 5,436,970 A | 7/1995 | Ray et al. | |
| 5,457,747 A | 10/1995 | Drexler et al. | |
| 5,479,510 A | 12/1995 | Olsen et al. | |
| 5,484,988 A | 1/1996 | Hills et al. | |
| 5,506,691 A | 4/1996 | Bednar et al. | |
| 5,544,043 A | 8/1996 | Miki et al. | |
| 5,590,038 A | 12/1996 | Pitroda | |
| 5,602,933 A | 2/1997 | Blackwell et al. | |
| 5,602,936 A | 2/1997 | Green et al. | |
| 5,604,640 A | 2/1997 | Zipf et al. | |
| 5,613,001 A | 3/1997 | Bakhoum | |
| 5,647,017 A | 7/1997 | Smithies et al. | |
| 5,657,389 A | 8/1997 | Houvener | |
| 5,657,396 A | 8/1997 | Rudolph et al. | |
| 5,673,333 A | 9/1997 | Johnston | |
| 5,751,842 A | 5/1998 | Riach et al. | |
| 5,754,673 A | 5/1998 | Brooks et al. | |
| 5,768,382 A * | 6/1998 | Schneier et al. | 380/251 |
| 5,781,654 A | 7/1998 | Carney | |
| 5,784,503 A | 7/1998 | Bleecker, III et al. | |
| 5,787,403 A | 7/1998 | Randle | |
| 5,790,668 A | 8/1998 | Tomko | |
| 5,802,525 A | 9/1998 | Rigoutsos | |
| 5,825,907 A | 10/1998 | Russo | |
| 5,857,034 A | 1/1999 | Tsuchiya et al. | |
| 5,870,723 A * | 2/1999 | Pare et al. | 705/39 |
| 5,910,988 A | 6/1999 | Ballard | |
| 5,930,804 A * | 7/1999 | Yu et al. | 707/104.1 |
| 5,995,630 A | 11/1999 | Borza | |
| 6,005,963 A | 12/1999 | Bolle et al. | |
| 6,032,137 A | 2/2000 | Ballard | |
| 6,041,133 A | 3/2000 | Califano et al. | |
| 6,049,620 A | 4/2000 | Dickinson et al. | |
| 6,049,621 A | 4/2000 | Jain et al. | |
| 6,092,202 A * | 7/2000 | Veil et al. | 713/153 |
| 6,310,966 B1 * | 10/2001 | Dulude et al. | 382/115 |
| 6,401,206 B1 * | 6/2002 | Khan et al. | 713/176 |
| 2002/0062284 A1 * | 5/2002 | Kawan | 705/43 |

\* cited by examiner

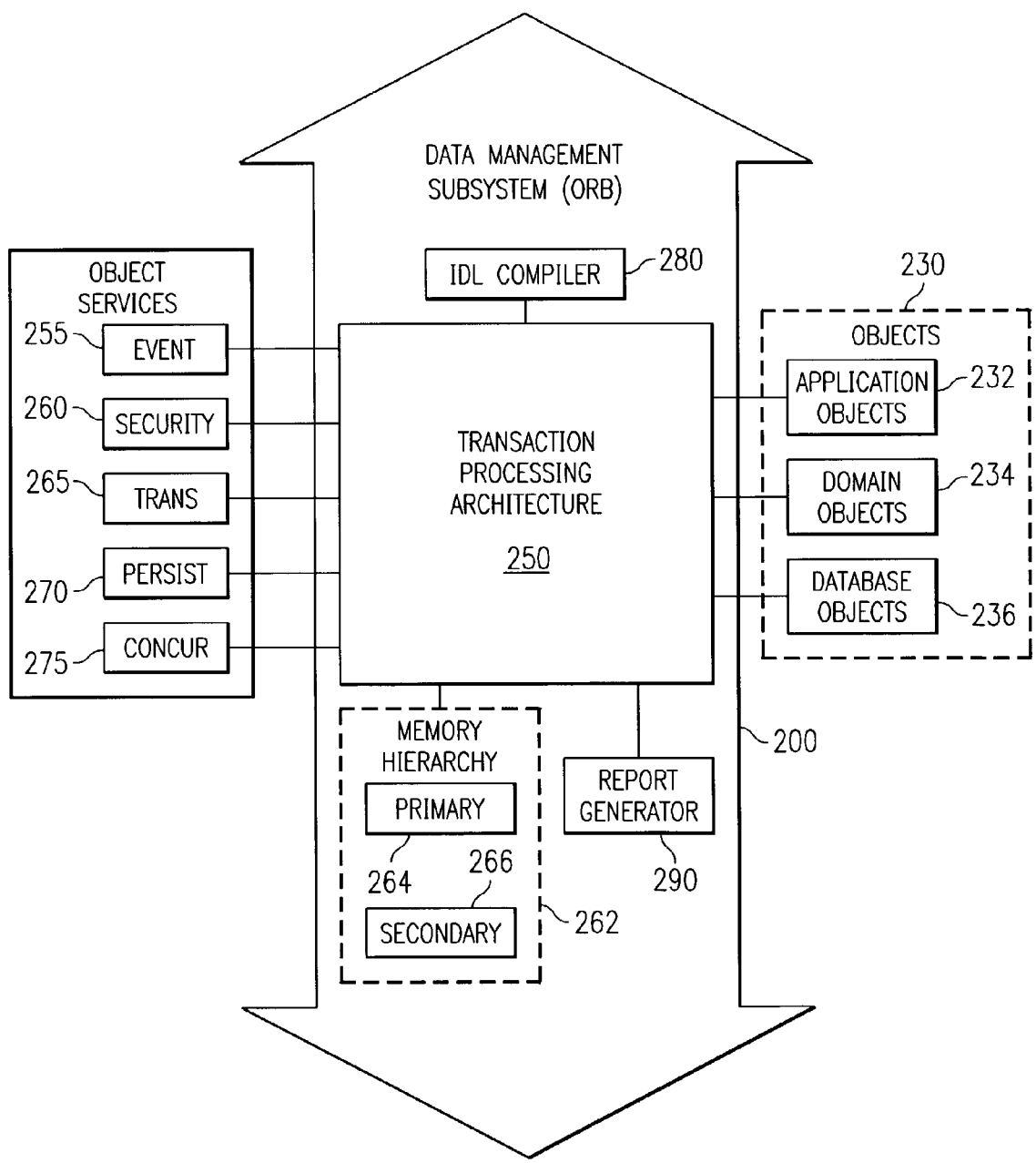

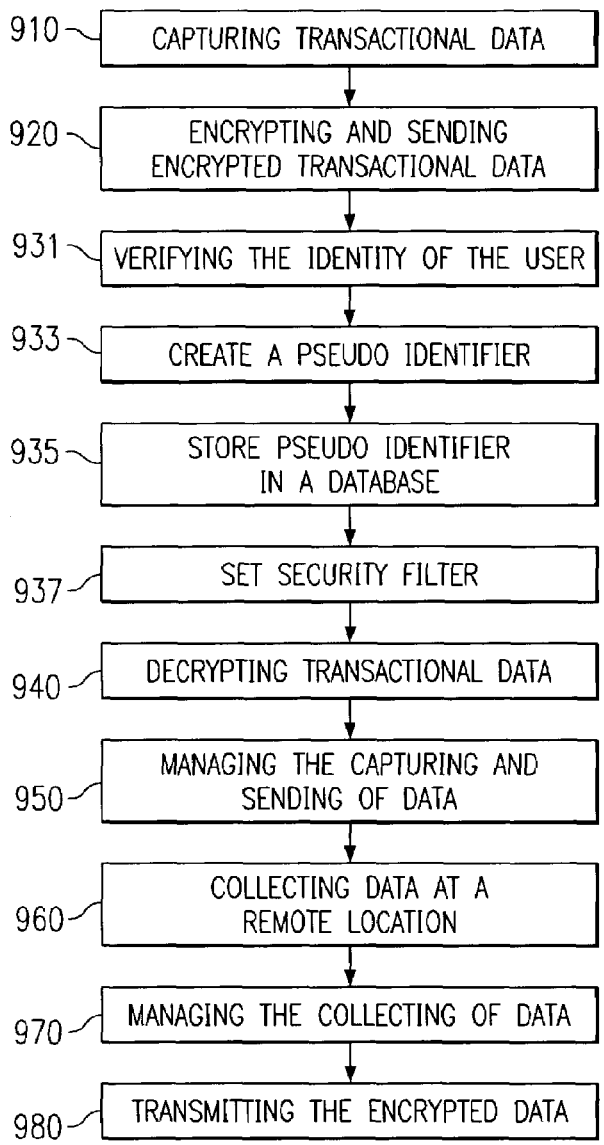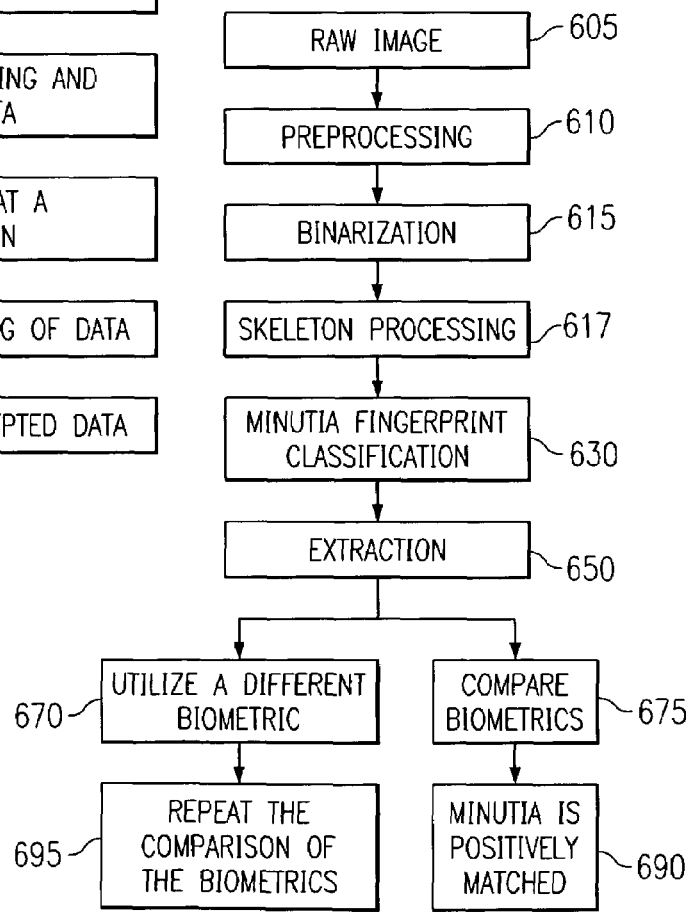

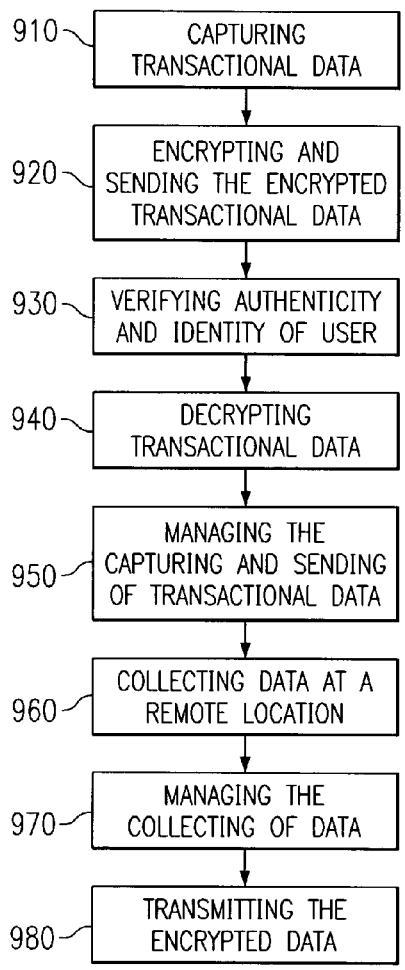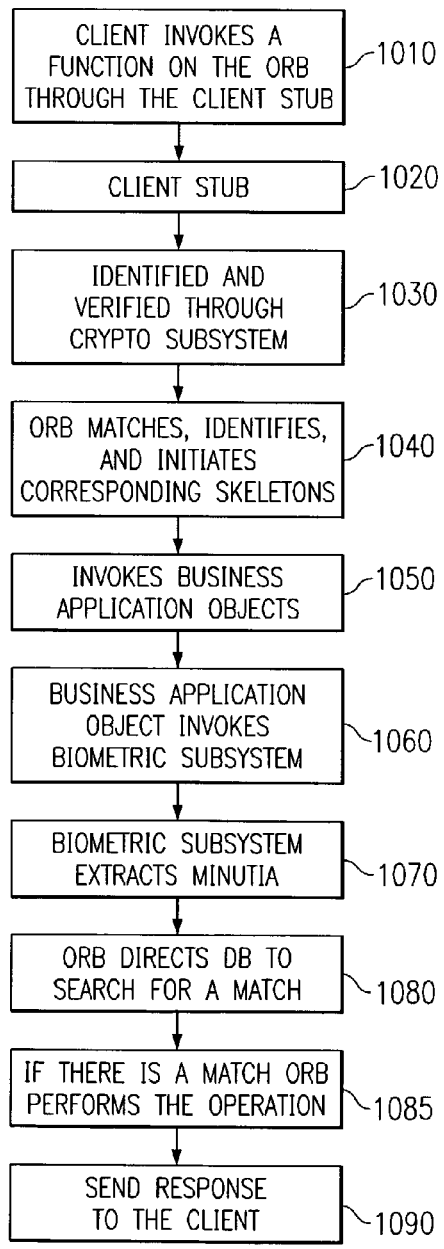

BIOMETRICALLY ENABLED PRIVATE SECURE INFORMATION REPOSITORY

CROSS-REFERENCE TO RELATED APPLICATIONS

This application claims priority, under 35 U.S.C. §119(e), of Provisional Application No. 60/323,159, filed Sep. 18, 2001. This application is also a continuation-in-part of copending application Ser. No. 09/454,492 filed Dec. 6, 1999, entitled "Remote Image Capture with Centralized Processing and Storage", by inventor C. Ballard, which is a divisional of application Ser. No. 09/081,012, filed May 19, 1998, now U.S. Pat. No. 6,032,137, which is itself a continuation-in-part of application Ser. No. 08/917,761, filed Aug. 27, 1997, now U.S. Pat. No. 5,910,988. All these applications and patents are incorporated herein by this reference.

STATEMENT REGARDING FEDERALLY SPONSORED RESEARCH OR DEVELOPMENT

Not applicable.

BACKGROUND OF THE INVENTION

This invention relates generally to a private system to store and retrieve all types of information with the use of biometrics for authentication and encryption techniques for security.

In this age of the information highway, virtually all personal and financial information is stored within computer systems. Yet this information tends to be scattered among different organizations, such as Federal and local governments, banks, merchants, and educational facilities. For this reason, access to all stored information from one source is virtually impossible, or, at the very least impracticable. Furthermore, in certain cases access to information requested by its provider, or owner, is restricted.

In today's information age, users are required to provide personal information freely, however, their access to that information may be strictly prohibited. Merchants normally require financial information to complete transactions, yet they are unlikely to divulge any credit data regarding that individual. Governmental agencies usually maintain a detailed profile database on all individuals, but some, or all, of this information is not accessible to the respective individuals. However, when governmental agencies do allow people to access their information, these venues can be described as inconvenient, limited in accessible hours, entailing waiting on long lines, and inadequate service. These facilities may include: county courthouses, departments of motor vehicles, departments of welfare services, departments of housing, departments of immigration and naturalization services, and the various other government agencies. A major reason the government will not allow computer access to personal information is due to security and identity verification issues. The infeasibility of a secure solution has made convenient access impracticable.

There is not one entity currently available to house all personal information for convenient retrieval. Personal information may include, but is not limited to: leases, deeds, passports, birth certificates, wills, trusts, driver's licenses, bank account information, credit information, commercial transaction information, educational information, and citizenship information.

Even if a secure system were available, security issues would make people hesitant to supply their personal information electronically. Hackers may attempt to compromise computer systems to conduct vandalism, espionage, and theft. It is possible for hackers to gain successful, unauthorized access to computer systems.

Even for systems with nearly absolute security, by allowing access only to authorized individuals, there is still the danger of fraud through the impersonation of an authorized user. For example, bad checks are abundant within the stream of commerce. Individuals may steal checks and forge signatures.

Other computer systems designs do not reflect the issue of security as a primary concern. Some systems utilize passwords in the form of alphanumeric characters, which can be easily guessed using algorithms capable of generating random combinations of numbers and letters. This type of security is further susceptible to user negligence, e.g., forgotten, lost, stolen, or intercepted passwords.

Other approaches have focused on providing secure identification and verification. U.S. Pat. No. 5,790,668 discloses a system and method to provide secure handling of data through means of a personal identifier database. Similarly, U.S. Pat. No. 5,930,804 discloses Web-based security measures and methods to implement such measures and Web-based authentication systems and methods. Similarly, U.S. Pat. No. 5,870,723 discloses a method and system to provide a biometric transaction authorization with the use of a PIN number. Similarly, U.S. Pat. No. 5,995,630 discloses a method to facilitate secure and authorized access to a computer.

While these approaches provide a method to avoid the problems associated with unauthorized access with user identification, they have disadvantages. These approaches focus on a gateway comprising security and user verification. First, these approaches do not offer a secure, authenticated centralized repository system. The database element in these approaches is limited to storing information pertinent to a particular business, or security purpose. For example, the databases in these inventions house only biometric information, personal identifiers, limited financial information, or encryption keys. Accordingly, these approaches do not offer an imnplementable system that serves as a secure repository in which to store any and all types of data.

These approaches also have a security deficiency, as they require a personal PIN number or personal identifier. These methods seriously compromise the security of the system as a whole. PIN numbers can be forgotten, lost, misplaced, and obtained through disreputable algorithmic approaches or other schemes.

Furthermore, systems that require personal identifiers commonly associate the person's Social Security Number with their identity. These approaches inherently lack the ability to provide anonymity to the users. Information is inexplicably tied to a particular person. Individuals are uniquely identified with ease through a Social Security Number. Moreover, Social Security Numbers are easily accessible and widely utilized. It is common practice for governmental institutions, financial institutions, educational institutions, and medical institutions and to use Social Security Numbers as personal identifiers. Most of these institutions utilize and display Social Security Numbers with disregard for privacy or security. Thus, the identity of the data owner can be easily obtained through his Social Security Number.

However, none of these verification systems offer a general, centralized database to store any, and all, types of data and information. Accordingly, there is a need for a system where any type of information may be stored securely and retrieved with anonymity, ease and convenience. Further, there is a need for a single, comprehensive, information storage system having reliability, privacy, authenticity, and accessibility.

By way of further background, U.S. Pat. No. 6,032,137 and U.S. Pat. No. 5,910,988 commonly assigned herewith and incorporated herein by this reference, describe data repository systems and methods, for example as applied to commercial payments and transactions.

SUMMARY OF THE INVENTION

This invention involves the storage and retrieval of data with the full identification and verification of users through means of a biometric identifier. The biometric identifier identifies biometric data or biometrics that comprises a statistical analysis of biological data, for example: retina geometry prints, facial prints, DNA data, fingerprints, or voice patterns. Biometric data represents a unique personal identity marker, which is in possession of the user at all times. The use of biometrics ensures a private system due to its inherent characteristics. The DataTreasury™ Repository System uses a biometric, as a unique identity marker. The usage of biometrics effectuates creates an extremely secure method of authentication for access to data stores. Furthermore, as communication protocols have become increasingly sophisticated users can access data anywhere in the world.

Users who wish to enroll into the DataTreasury™ Repository System must first present documents to authenticate their claimed identity. Upon registration they must input their biometrics, and any required information into client stations. The biometrics obtained through the registration process are is stored in an enrollment biometric database. The enrollment biometrics are utilized to assist in the verification of the user in future transactions.

As a paradigm, merchants, as well as financial institutions, may enroll in the DataTreasury™ Repository System to facilitate financial transactions. Commercial users can take the form of a host within the DataTreasury™ Repository System, and utilize its services to conduct business. Financial transactions are not limited to financial institutions that are enrolled into the system. The DataTreasury™ Repository System may further communicate with, transmit information to, and facilitate transactions with financial institutions that are not enrolled. The DataTreasury™ Repository System may further communicate and conduct transactions with any non-enrolled user or entity, whether an institution, a business, or an individual.

It is an object of the present invention to provide a system for a secure, centralized storage of all types of information. For example, a system which could handle commercial transaction information, financial information, credit information, citizenship information, educational information with authenticated access, would comprise:

at least one remote client subsystem designed to receive and transmit data;

at least one remote data processing subsystem designed to facilitate the processing of data, comprising an encryption subsystem to ensure a secure, biometric authentication subsystem to ensure the identity of users;

at least one remote data management subsystem to manage the processing of data;

at least one remote data storage subsystem to store any, and all, types of data; and at least one communication network for secure transmission of data within, and between the data processing subsystem, the data management subsystem, and the data storage subsystem.

The DataTreasury™ Repository system securely supplies authenticated access to information such as, credit information, banking information, personal information, real-estate information, employment information, and commercial transaction information.

It is a further object of the DataTreasury™ Repository System to facilitate: private and secure financial transactions, via a centralized, secure, and easily accessible system worldwide.

It is a further object of the DataTreasury™ Repository System to facilitate a virtually fraud proof system of conducting transactions.

It is a further object of the DataTreasury™ Repository System to facilitate a private method to traverse the internet.

It is a further object of the DataTreasury™ Repository System to facilitate the secure and private electronic communication between computer systems.

It is a further object of the DataTreasury™ Repository System to facilitate the registration process for warranties, and similar legal documents.

It is a further object of the DataTreasury™ Repository System to secure email communication and prevent unsolicited advertisements or spamming.

It is further object of the DataTreasury™ Repository System of the invention to store and provide data with a multi-tiered architecture comprised of the DataTreasury™ Object Request broker (ORB), the DataTreasury™ Application Server (AS), the DataTreasury™ Database (DB), DataTreasury™ Encryption Subsystem (ES), and a DataTreasury™ Biometric Subsystem (DTBS).

BRIEF DESCRIPTION OF THE SEVERAL VIEWS OF THE DRAWING

These and other objects and features of the invention will be more clearly understood from the following detailed description along with the accompanying drawing figures, wherein:

FIG. 4 is a block diagram of the Object Request Broker (ORB) architecture;

FIG. 7 is a block diagram of the process for analyzing and storing biometrics using the DataTreasury™ Biometric Subsystem architecture;

FIG. 9 is a flow chart of the process for transferring information;

FIG. 10 is a flow chart describing the process for the DRS; and

FIG. 11 is a flow chart of the second embodiment of the process shown in FIG. 9.

DETAILED DESCRIPTION OF THE INVENTION

Figure 1:
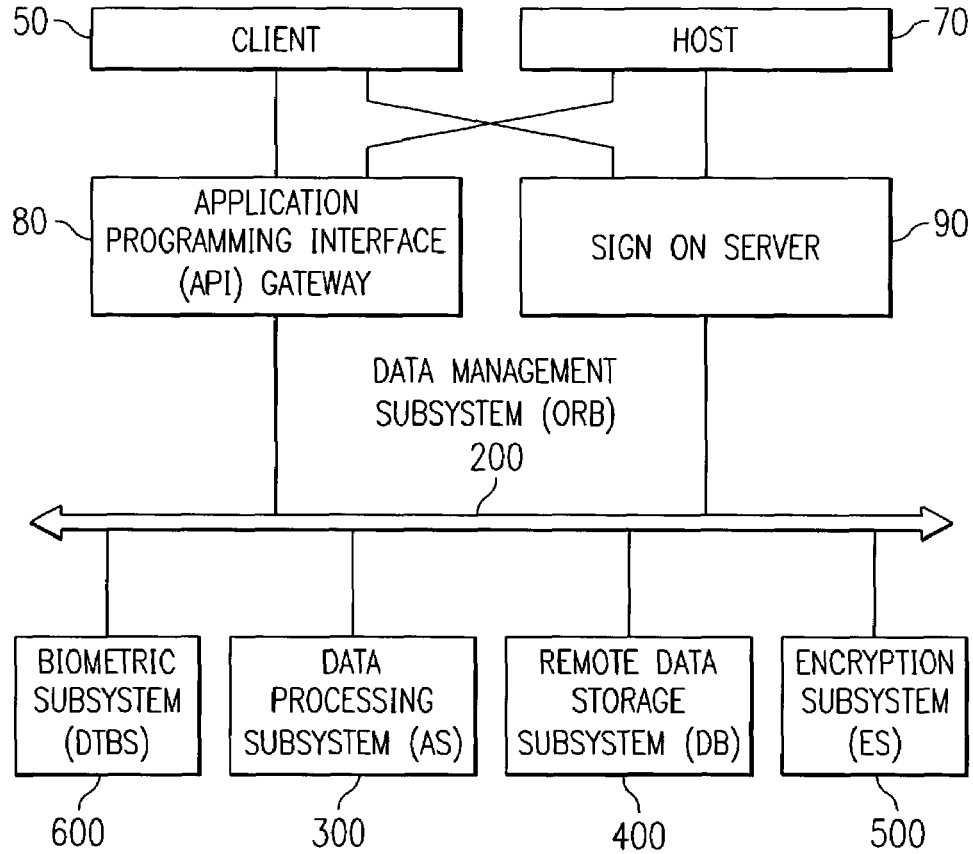
FIG. 1 is a block diagram of the DataTreasury™ Repository System (DRS) architecture.

FIG. 1 displays the block diagram of a DataTreasury™ Repository System (DRS) 100, which is connected to either clients 50 or hosts 70 via either an Application Programmable Interface (API) gateway 80 or through a sign on server (SOS) 90. The DataTreasury™ Repository System 100 has five elements: a DataTreasury™ Object Request broker (ORB) 200

(transaction management subsystem), a DataTreasury™ Application Server (AS) 300 (data processing subsystem), a DataTreasury™ Database (DB) 400 (data storage subsystem), DataTreasury™ Encryption Subsystem (ES) 500 (system to ensure security), and a DataTreasury™ Biometric Subsystem (DTBS) 600 (system to process and verify biometrics).

Figure 2:
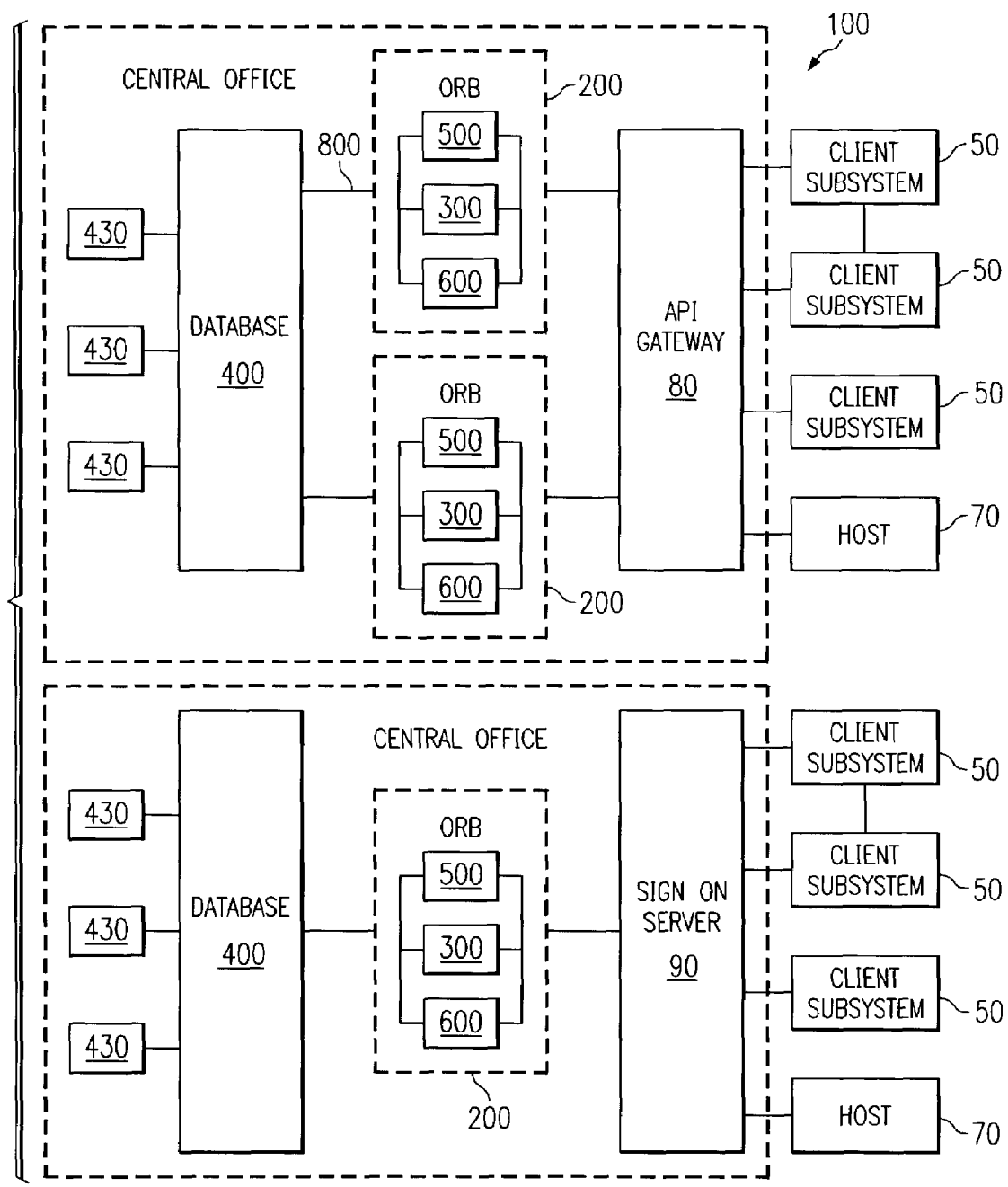
FIG. 2 is a block diagram of the distributed environment.

As shown in FIG. 2, the DataTreasury™ Repository System 100 uses an object oriented programming language for housing any and all types of information across a distributed environment. Data is sent to the ORB 200 via client subsystems 50 and hosts 70. This information is first encapsulated, next, it is compressed and then it is encrypted before it is sent through API gateway 80 or SOS 90. This information is then decrypted and processed through ORB 200, which in connection with AS 300, ES 500, and DTBS 600, processes this information. This information is then sent on to DB 400 for storage of this information or retrieval of additional information stored in DB 400. A communication network 800 connects these elements together. As shown, API gateway 80, SOS 90, ORB 200, AS 300, DB 400, relational databases 430, ES 500, and DTB 600 are all housed in a central location. API gateway 80 or SOS 90 are designed to receive information from clients 50 or hosts 70. SOS 90 is designed as a single sign on server whereby with one password or one set of biometric information, the user can gain access to multiple accounts that would formerly take multiple login identifications and passwords.

Figure 3:
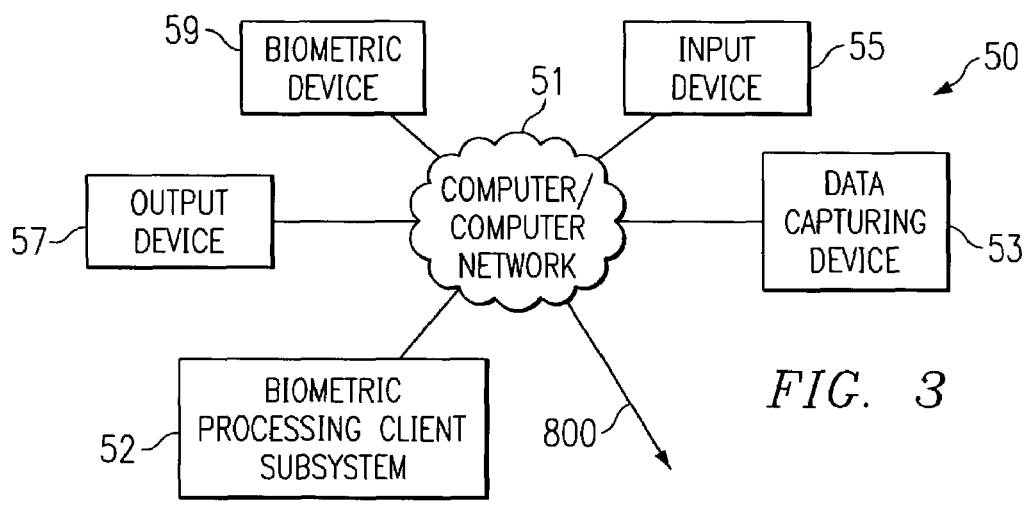
FIG. 3 is a block diagram of the client subsystem.
Figure 5:
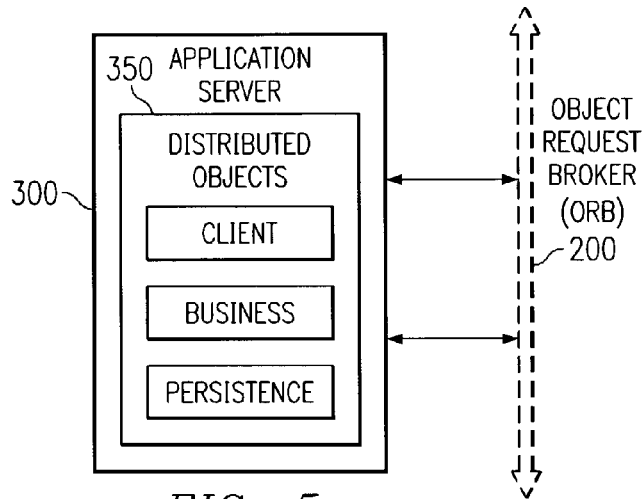
FIG. 5 is a block diagram of the Application Server (AS) architecture.
Figure 6:
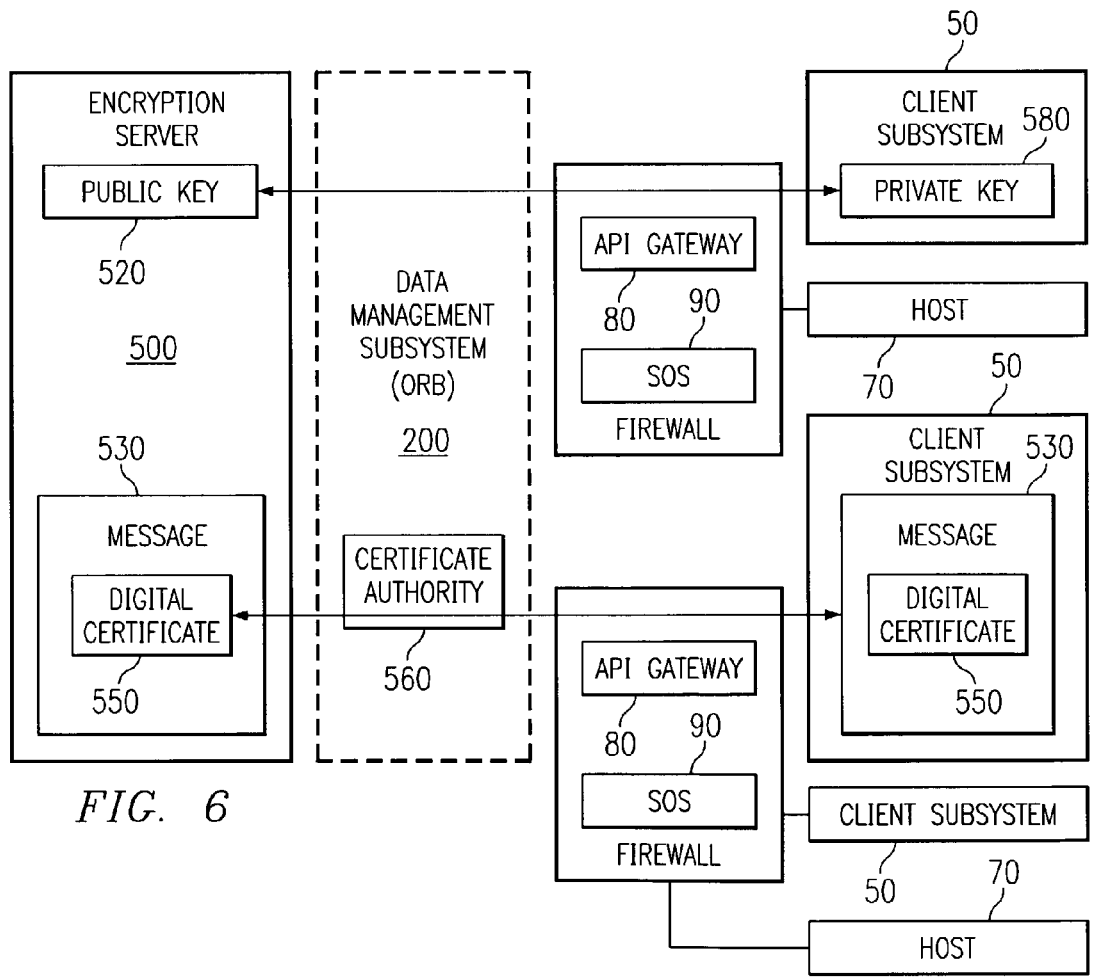
FIG. 6 is a block diagram of the Encryption Server architecture.
Figure 8:
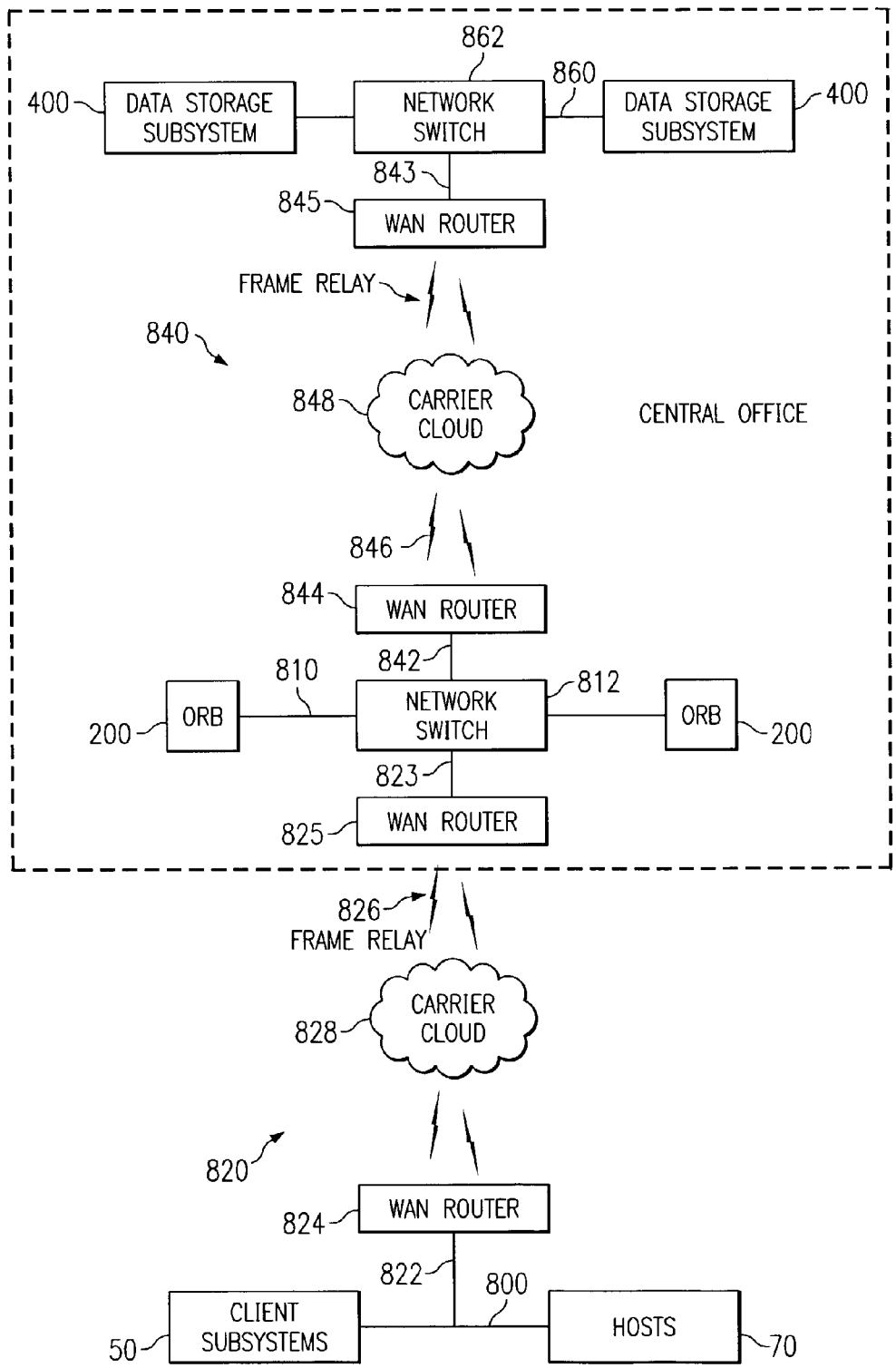
FIG. 8 is a block diagram of the communication network.

Client subsystem 50 is shown in greater detail in FIG. 3, ORB 200 is shown in greater detail in FIG. 4, AS 300 is shown in greater detail in FIG. 5, ES 500 is shown in greater detail in FIG. 6, the process for DTBS 600 is shown in greater detail in FIG. 7, and communication network 800 is shown in greater detail in FIG. 8.

As shown in FIG. 3, client subsystem 50 provides a convenient interface to users to enable data entry and extraction from the DB 400. A simplified interface to enable data extraction from a database for use in the present invention is described in U.S. Pat. No. 5,910,988, U.S. Pat. No. 6,032,137, and U.S. patent application Ser. No. 09/454,492 to Ballard, entitled "Remote Image Capture with Centralized Processing and Storage", which is incorporated herein by reference. Furthermore, the client subsystems 50 may also be hosts 70. These client subsystems may contain a biometric processing client subsystem 51, and a data capturing device 53. The client subsystem may contain input devices 55 such as but not limited to: video cameras, digital cameras, CD-ROM readers, DVD readers, keyboards, mice, microphones, smart card readers, scanners, magnetic strip readers, MICR readers, 2D/3D bar code readers, and biometric capture devices. The client subsystem may also contain output devices 57 which may facilitate report generation such as but not limited to: monitors, printers, and speakers. Client subsystems 50 may further take any form comprising a point of sale, Internet, or wireless machines, to name a few. Furthermore, client subsystems 50 may also contain a biometric device 59 for capturing biometric data.

Client subsystems 50 may connect to the ORB 200 through a communication network such as communication network 800. However client subsystem 50 may connect to ORB 200 by any means including, but not limited to, the internet, wireless RF, microwave, infrared or, through a wired local or wide area network. A wireless data network may be used for connecting one or more client subsystems 50 to one or more centralized processing facilities. This wireless network is employed for either local area network (LAN) or wide area network (WAN) connectivity, or both simultaneously. The wireless network is not limited to a specific technology, transmission speed, or mode of operation. The physical means for communication between the client subsystem 50 and the ORB 200 may be facilitated by, but not limited to modems, cables, fiber optics, or satellites. Furthermore, Client subsystems 50 are not tied to a specific programming language. Client subsystems 50 and AS 300 in a distributed environmental need only communicate in terms of the ORB 200, interface. The ORB 200 may act as a middle ware layer between the client subsystems 50 and all types of heterogeneous sources. Furthermore, the ORB 200 may automate services such as, but not limited to: object registration, location, activation, and demultiplexing. The ORB 200 handles the request between the client subsystem 50 to the AS 300. Objects 350 are encapsulated packages of code and data that can be manipulated by operations through a defined interface. The ORB 200 initiates queries of the DB 400, which are necessary for object 350 functionalities. The DataTreasury™ Repository System enables, identifies, authenticates, and processes information using, inter alia, biometric and cryptographic algorithms.

As is known to persons of ordinary skill in the art, the DataTreasury™ Repository System 100 could also use other software development standards, other system deployment standards, and other reliability standards as long as adherence to these alternative standards provides the security, availability, integrity and reliability required by mission critical applications of this scale. See, e.g. Fayad, Johnson, and Schmidt, "Building Application Frameworks: Object Oriented Foundations of Framework Design", chap. 1 to chap. 6, (Wiley, 1999).

FIG. 4 is a block diagram of the ORB 200 architecture. ORB 200 can exist on one or more servers and can contain a transaction processing architecture 250, which manages objects 230 such as application objects 232, domain objects 234, and database objects 236. In addition, transaction processing architecture 250 also manages events 255, transactions 265, persistence 270, concurrency 275 and security 260. In the preferred embodiment, the ORB 200 is facilitated through the use of Common Object Request Broker Architecture (CORBA). The ORB 200 may provide a series of services including but not limited to: life cycle services, persistence services, naming services, event services, concurrency control services, transaction services, relationship services, externalization services, query services, licensing services, and properties services. Life cycle services define how to create, copy, move, and delete components. A component is a reusable program building block that can be combined with other components in the same or other computers in a distributed network to form an application. The persistence service facilitates the ability to store data on the DB 400.

The naming service allows components to find other components by name. The event service allows the components to specify specific events to be notified of. The concurrency control service allows the ORB 200 to manage locks to data caused by competing transactions or threads. The transaction service ensures that once transactions are completed, the required functions are performed, and to ensure the consistency of the DB 400. The relationship service can create and/or keep track of dynamic associations between components. The externalization service provides a method to add and obtain data from a component resident in a stream of data. The query service allows the component to query the DB 400. The licensing service allows the use of the component to be measured. Lastly, the properties service allows components to have a self description, which in turn can be used by other components. The client subsystems 50 use stubs to invoke the required application objects 230 in AS 300 through the ORB 200 for the required transaction. ORB 200 can also contain a memory hierarchy 262 containing a primary memory 264 and a secondary memory 266.

In the preferred embodiment, the ORB 200 server comprises stand-alone IBM Enterprise RS/6000 7026 Model M80 servers, which are connected through a common network. Typically, the IBM Enterprise RS/6000 7026 Model M80 class computers have 6 GB of RAM, a 1.26 TB Shark storage array, and gigabit Ethernet network connection.

The client subsystems 50 requests to the AS 300, DB 400, ORB 200, and hosts 70 are facilitated through CORBA compliant services. Object request brokers, ORB 200 can create a persistent link between client subsystems 50, hosts 70 and AS 300 for servicing requests. AS 300 and ORB 200 are usually the middle tier and databases are maintained in the third tier. AS 300 requires CORBA services to communicate with third tier databases for executing queries.

As is known to persons of ordinary skill in the art, CORBA or any equivalent architectural framework may be utilized to construct an ORB 200 to provide load balancing and allocation of services between application servers and databases.

In an alternate embodiment, an information gateway may be utilized to construct the ORB 200. The object based ORB 200 may be also implemented with a message, transaction, or event based architectural frameworks. An exemplary embodiment of alternate architectural frameworks which may be utilized, as known to persons of ordinary skill in the art, include but are not limited to: MQ series, Tuxedo, and Rendezvous. See, e.g., Bernstein, and Newcomer, "Principles of Transaction Processing", chap. 2 to chap. 10, (Morgan Kaufman Publishers, 1997). Additionally, see, e.g., Primatesta, "Tuxedo, an Open Approach to OLTP", chap. 2 to chap. 6, (Prentice Hall, 1995). Further, see, e.g., Gilman and Schreiber, "Distributed Computing with IBM MQSeries", chap. 3 to chap 10, (Wiley, John & Sons, Incorporated, 1996).

As will be understood by those skilled in the art, Object-Oriented Programming (OOP) techniques involve the declaration, definition, creation, invocation and destruction of "objects" 230. OOP focuses on objects rather than specific functions. In object-oriented programming, objects are the concepts to consider first in designing a program and they may also comprise units of code that are eventually derived from the process. In between, each object is made into a generic class of object and even more generic classes are defined so that objects can share models and reuse the class definitions in their code. Each object is an instance of a particular class or subclass with the class's own method or procedures and data variable. An object is what actually runs in the system. See, e.g., Rumbaugh, Blaha, Premerlani, Eddy, and Lorensen, "Object Oriented Modeling and Design", chap. 1 to chap. 10, (Prentice Hall, 1991). These objects 230 are software entities comprising data elements and routines, or functions, which manipulate the data elements. The data and related functions are treated by the software as an entity and can be created, used and deleted in a parallel and concurrent fashion. Together, the data and functions enable objects 230 to model virtually any real-world entity in terms of its characteristics, represented by the data elements, relationships and its behavior. Object 230's behavior determines how and when it manipulates its data elements. In this way, objects 230 can model complex physical phenomena like weather systems, and it can also model abstract complexities like many mathematical algorithms.

In the preferred embodiment, through a communication network, the ORB 200 are connected to the AS 300 and DB 400 through a LAN using switched 1000BaseT/100BaseT Ethernet, using TCP/IP protocol, though the invention is not so limited. As is known to persons of ordinary skill in the art, the 1000BaseT/100BaseT Ethernet is a networking link layer protocol. Further, the numbers 1000 and 100 refer to the communication link speed in megabits per second. In the preferred embodiment the CISCO Catalyst 6000, model No. 6509, Network Switch or equivalent hardware supports the LAN connectivity between the devices connected to it. A communication network for use in the present invention is described in U.S. Pat. No. 5,910,988, U.S. Pat. No. 6,032,137, and U.S. patent application Ser. No. 09/454,492 to Ballard, entitled "Remote Image Capture with Centralized Processing and Storage", which is incorporated herein by reference.

The ORB 200 and the client subsystems 50 are connected on a Wide Area Network (WAN). A WAN router facilitates communication between the client subsystem 50 and the ORB 200. In the preferred embodiment, the WAN uses frame relay connectivity. As is known to persons of ordinary skill in the art, frame relay is a network protocol for data communication. In contrast to dedicated point-to-point links that provide a fixed data rate, frame relay communication provides variable bandwidth availability on-demand with a guaranteed minimum data rate. Frame relay communication also allows occasional short high data rate bursts according to network availability. In the preferred embodiment, the CISCO 2621 router, or equivalent hardware, supports the WAN connectivity between the devices.

Each frame encloses one user packet and adds addressing and verification information. Frame relay data communication typically has transmission rates between 56 kilobytes per second (kb/s) and 1.544 megabytes per second (Mb/s). Frames may vary in length up to a design limit of approximately 1024 bytes.

In the preferred embodiment, the telecommunications frame relay carrier cloud is a communication network, which receives the frames destined for the ORB 200 sent by the WAN router from the client subsystems 50. As is known to persons of ordinary skill in the art, carriers provide communication services through local central offices. These central offices contain networking facilities and equipment to interconnect telephone and data communications to other central offices within its own network and within networks of other carriers.

Since the component links of the interconnection network are shared by the carrier's clients, data communication must be dynamically assigned to links in the network according to availability. Because of the dynamic nature of the data routing, the interconnection network is referred to as a carrier cloud of communication bandwidth.

The ORB 200 may be coupled with a firewall (See FIG. 6) to provide more secure communication. A firewall is a security device which prevents unauthorized users and/or data traffic from gaining access to a computer network, and/or monitors the transfer of information to and from the network. Client subsystem 50 requests and system responses between system and client subsystem 50 programs are communicated through a filtering router. Firewalls are well known within the art. See, e.g., Strebe and Perkins, "Firewalls 24 Seven", part 1 and part 2, (Sybex, Network Press, 2000). Filtering routers interrogate the source and destination addresses of open network messages communicated through the router to verify that the source and destination addresses conform to the requirements specified by the operator for communication through the router.

For example, the filtering router does not pass communication messages through it, when these messages arrive from an external network that have a source address which corresponds to the same network for the destination address. This prevents a "spoofing" attack where a computer outside a computer network attempts to emulate another computer on the network to which the destination address computer is coupled, to exploit potentially lower security measures for computers on the same network. Spoofing is the attempt to exploit the source routing feature of the TCP/IP protocol by intentionally creating packets with incorrect IP addresses. In spoofing the hacker disguises himself as a host 70 or router on the targeted network to circumvent some security measures. Transmission from the ORB 200 is preferably first passed through a proxy firewall. Proxy firewalls require the use of a proxy server, or bastion host. The bastion host prevents the direct access to Internet services by the internal users by acting as their proxy, and filtering out unauthorized traffic. A proxy is a structure, where one system acts as a vanguard to another system in making and responding to request. The firewall is preferably implemented with PGP Security Inc. Gauntlet, version 5.5. This is a fully integrated system which provides both packet filtering and proxy services. It also contains software enabling remote management of the firewall throughout the entire enterprise.

FIG. 5 is a block diagram of the DataTreasury™ Application Server (AS) 300. The AS 300 processes all transactions initiated by the ORB 200. However, it is essential that each transaction must be first verified by the encryption application object subsystem 230 and the biometrics application object subsystem 230. A system for processing data for later authorized retrieval for use in the present invention is described in U.S. Pat. No. 5,910,988, U.S. Pat. No. 6,032,137, and U.S. patent application Ser. No. 09/454,492 to Ballard, entitled "Remote Image Capture with Centralized Processing and Storage", which is incorporated herein by reference.

In the preferred embodiment, the AS 300 server comprises stand-alone IBM Enterprise RS/6000 7026 Model M80, which are connected on a common network. Typically, the IBM Enterprise RS/6000 7026 Model M80 class computers have an 6 GB of RAM, a 1.26 TB Shark storage array, and a gigabit Ethernet network connection.

Application services of the AS 300 are preferably application programs written in a programming language such as Java, C, or C++. In a preferred embodiment, the invention is implemented in the C++ programming language using object-oriented programming techniques. C++ is a compiled language, that is, programs are written in a human-readable script and the script is then provided to a program called a compiler, which transforms the human readable code and produces object code. The resulting object code is then processed by a second process, called a linker. The linker incorporates various library routines required by the object code. The output of the linker is machine executable code. As described below, the C++ language has certain characteristics which allow a software developer to easily use programs written by others while still providing a great deal of control over the reuse of programs to prevent their destruction or improper use. The C++ language is well known and many articles and texts are available which describe the language in detail. In addition, C++ compilers are commercially available from several vendors including Sun Microsystems, Inc. and Microsoft Corporation. Accordingly, for reasons of clarity, the details of the C++ language and the operation of the C++ compiler will not be discussed further in detail herein.

As used herein, the term "object" refers to an encapsulated package of code and data that can be manipulated by operations through a defined interface associated with a distributed object 350. The encryption subsystem 500, biometric subsystem 600, collector subsystem, and other business application subsystems are all instantiated through AS 300 objects. Thus, distributed objects 350 will be seen by those skilled in the art as including the basic properties that define traditional programming objects. However, distributed objects 350 differ from traditional programming objects by the inclusion of two important features. First, distributed objects 350 are multilingual. Distributed objects 350 may be comparable to object abstractions in various programming languages. Distributed object 350 provides a set of fields and methods accessible to clients 50. Distributed objects 350 give users a virtual model of the data source, allowing seamless integration of heterogeneous data models and protocols. A framework is necessary for management of the distributed objects. The framework can dynamically replicate objects, providing automatic load balancing, event handling and fault tolerance. This technology offloads business logic processing from the client 50 side onto middle ware object services.

The interfaces of distributed objects 350 are defined using an interface definition language that can be mapped to a variety of different programming languages. The Object Management Group produces one such Interface Definition Language (IDL). IDL is a language used by CORBA to define interfaces between application components. The IDL generates the stubs and skeletons.

Second, distributed objects 350 are location, language, client subsystem 50, or hosts 70 independent, i.e., distributed objects 350 can be located anywhere in a network. This contrasts sharply with traditional programming objects, which typically exist in the same physical address space as the client subsystem 50. Distributed objects 350 can be object clients or object servers, depending upon whether the object 350 sends requests to other objects 350 or replies to requests from other objects 350. Requests and replies are made through the ORB 200, which is aware of the locations and status of the objects 350. A distributed object system refers to a system comprising distributed objects 350 that communicate through the ORB 200. An object reference is a unique way to identify objects 350. The creation and definition of object references dependent on the ORB 200 will be familiar to those skilled in the art.

When a client subsystem 50 calls one of the AS 300 objects 350 to invoke an object operation, the corresponding stub points to a skeleton. The ORB 200 passes the invocation from the client subsystem 50 stub to the application server skeleton. Stubs are code produced by the IDL compiler in conjunction with client subsystem 50 applications to facilitate an interface with the ORB 200. Skeletons are proxy code, which facilitates the application server implementations through a corresponding interface. The corresponding object 350 implementation to the skeleton is then able to perform the requested service; which in turn can return any results through the ORB 200 skeleton to the client subsystem 50.

In the preferred embodiment, through communication network 800, the AS 300 are connected to the ORB 200 using switched 1000BaseT/100BaseT Ethernet, and TCP/IP protocol though the invention is not so limited. As is known to persons of ordinary skill in the art, 1000BaseT/100BaseT Ethernet is a networking link layer protocol. Further, the numbers 1000 and 100 refer to the communication link speed in megabits per second. In the preferred embodiment the CISCO Catalyst 6000, model 6509, Network Switch or equivalent hardware supports the LAN connectivity between the devices connected to it.

Turning back to FIG. 2, there is a block diagram of the DB 400 having associated databases 430. DB 400 is responsible for replication and synchronization and responds to queries directed by the ORB 200. An essential aspect of the DB 400 is its storage and retrieval of any type of data including biometric data. In the preferred embodiment all data stored in the DB 400 is encrypted to maximize privacy and security. A remote secure, reliable, and centralized repository to store data for later retrieval for use in the present invention is described in U.S. Pat. No. 5,910,988, U.S. Pat. No. 6,032,137, and U.S. patent application Ser. No. 09/454,492 to Ballard, entitled "Remote Image Capture with Centralized Processing and Storage", which patent is incorporated herein by this reference.

In the preferred embodiment, the DB 400 server comprises stand-alone IBM Enterprise RS/6000 7026 Model M80 servers, which are connected on a common network. The IBM Enterprise RS/6000 7026 Model M80 class computers have 6 GB of RAM, a 1.26 TB Shark storage array, and a gigabit Ethernet network connection.

As shown in FIG. 2, DB 400 is a centralized storage subsystem, which comprises numerous databases 430 housed in separate remote physical locations. Data is partitioned by its type and housed in distinct locations. Further, the DB 400 is capable of replicating itself to mirrored databases 430, located either on site or in separate sites.

In the preferred embodiment of the invention, a one to many search is utilized to scan the entire data set of enrolled biometric data resident on the DB 400 to determine the identity of a user to allocate the appropriate account. The search and matching processing of the DB 400 may be implemented on servers containing multiple CPU's, each CPU working on a subset of the data. A massive parallel clustering scheme may be utilized to merge all processors within one server, or it's functional equivalent. Further, all operating data may be held in RAM at all times for maximum throughput.

Further, in the preferred embodiment, an efficient search and matching algorithm may be implemented with the DB 400 for an expeditious one to many search. An exemplary algorithm suitable for use in the preferred embodiment is the Veridicom Software Development Kit, Minutia Extraction Module and Fingerprint Verification Module, version linux-sdk-2.6.2.9-i386, available from Veridicom Incorporated, Santa Clara, Calif. The Minutia Extraction Module scans and produces minutia based on features such as ridge endings, spacing, bifurcations, etc. Further, it extracts particularly significant minutia to perform a relative and distinct comparison between fingerprints; eliminating noisy minutia, borders, wrinkles, smudges, etc. The software produces templates of 1 KB (uncompressed) or 300 bytes (compressed) for use with the Fingerprint Verification Module. The searching algorithm categorizes the stored fingerprint minutia into four categories: left loop, right loop, whirl, and neither. This categorization reduces the number of minutia to search and to match against hence, making the searching and matching process faster. The software scores these results, and provides statistics on matches relying on matching minutia based on distance, and neighborhood placement/orientation discrimination. This technique is capable of distinctly matching individuals based on discriminating minutia. Though the extraction module may extract many minutia, the matching set is very small based on the matching criteria mentioned above and allows the matching algorithm to be more efficient, since less minutia are being compared.

An alternate embodiment of a search and matching algorithm may be used as described in the U.S. Pat. No. 5,802,525 to Isidore Rigoutsos, entitled "Two-Dimensional Affine-Invariant Hashing Defined Over Any Two-Dimensional Convex Domain and Producing Uniformly-Distributed Hash Keys", U.S. Pat. No. 6,072,895 to Rudolf Maarten Bolle, et al., entitled "System and Method Using Minutiae Pruning for Fingerprint Image Processing", U.S. Pat. No. 6,049,621 to Anil Jain, et al., entitled "Determining a Point Corresponding Between Two Points in Two Respective (Fingerprint) Images", U.S. Pat. No. 6,041,133 to Andrea Califano, et al., entitled "Method and Apparatus for Fingerprint Matching Using Transformation Parameter Clustering Based on Local Feature Correspondence", U.S. Pat. No. 6,005,963 to Rudolf Maarten Bolle, et al., entitled "System and Method for Determining if a Fingerprint Image Contains an Image Portion Representing a Partial Fingerprint Impression".

In another embodiment of the invention, the device may include a personal identifier that is assigned to each user to narrow the search parameters for matching biometric data. This personal identifier reduces the search from the entire set of data on the DB 400 to a manageable subset of data. The identifier is utilized to effectuate an enhanced rate of searching in the DB 400. The personal identifier may include but is not restricted to area codes, zip codes, or any other personal identifier representing the user's allocated group.

DB 400 Database server also includes local data memory, which is preferably implemented with the IBM DB2, version 6.1, relational database, which was designed to support both data and image storage within a single repository. This is a relational database management system ("RDBMS") for managing data operations between local data memory and application services. IBM DB2 is a commercially available software product of International Business Machines Corporation, New Orchard Road, Armonk, N.Y. The dynamic server of the preferred embodiment uses multiprocessing to efficiently process database 430 commands and other messages communicated through application services without delaying application service processing and communication with client subsystem 50 programs. Other embodiments of local data memory are possible as long as the embodiment is a highly available platform with sufficient storage and access times for the storage and retrieval of data. The database need not reside on a single physical platform; it may reside on several computing platforms comprising one logical unit, as in a database cluster. An application can access data from the client subsystem 50 and the server. Likewise, such an interface may be required when an application service is implemented in an object-oriented language such as C++ and local data memory is a relational database 430.

It is essential that the DB 400 is designed to store and house any and all types of information within user accounts including, but not limited to: biometric, financial, business, personal, or academic; known henceforth as transactional data. User accounts are defined as storage allotted to each particular user within the DB 400. This system can receive, transmit, store, and process any type of transactional data, which may include but is not limited to: leases, deeds, passports, birth certificates, wills, trusts, driver's licenses, bank account information, credit information, commercial transaction information, educational information, citizenship information, photographs, pictures, digital sound files, digital graphic files, medical information, laboratory notes, grocery lists, personal dairies, to do lists, Christmas lists, digital movies, customer lists, trade secrets, computer source code, electronic mails, merchant inventory lists, cash flow information, expense information, consumer demographic information, sales information, payroll information, tax information, retirement information, investment information, benefits information, biometric information, incentive information, coupon information, governmental assistance program information, electronic cash, electronic signature information and voting information.

As known to persons of ordinary skill in the art, a relational database 430 consists of a collection of tables each of which have a unique name. See, e.g. Toerey, "Database Modeling & Design, Second Edition", chap. 2 and chap. 3, (Morgan Kaufmann Publishers, 1994). A database schema is the logical design of the database. Each table in a relational database has attributes. A row in a table represents a relationship among a set of values for the attributes in the table. Each table has one or more superkeys. A superkey is a set of one or more attributes, which uniquely identify a row in the table. A candidate key is a superkey for which no proper subset is also a superkey. A primary key is a candidate key selected by the database designer as the means to identify a row in a table.

As is well known to persons of ordinary skill in the art, the DataTreasury™ Repository System 100 could use other database models available from other vendors including the entity relationship model as long as the selected database meets the storage access efficiency and synchronization requirements of the system. See, e.g., Toerey, "Database Modeling & Design, Second Edition", chap. 2 and chap. 3, (Morgan Kaufmann Publishers, 1994).

An exemplary DB 400 basic schema consists of the tables listed below. Since the names of the attributes are descriptive, they adequately define the attributes' contents. The primary keys in each table are identified with two asterisks (**).

I. CUSTOMER: This table describes the DataTreasury™ Repository System customer.
   A. **CUSTOMER.sub.--ID
   B. COMPANY.sub.--NAME
   C. CONTACT
   D. CONTACT.sub.--TITLE
   E. ADDR1
   F. ADDR2
   G. CITY
   H. STATE.sub.--CODE
   I. ZIP.sub.--CODE
   J. COUNTRY.sub.--CODE
   K. VOX.sub.--PHONE
   L. FAX.sub.--PHONE
   M. CREATE.sub.--DATE II. CUSTOMER.sub.--MAIL.sub.--TO: This table describes the mailing address of the DataTreasury™ Repository System customer.
   A. **MAIL.sub.--TO.sub.--NO
   B. **CUST.sub.--ID
   C. CUSTOMER.sub.--NAME
   D. CONTACT
   E. CONTACT.sub.--TILE
   F. ADDR1
   G. ADDR2
   H. CITY
   I. STATE.sub.--CODE
   J. ZIP.sub.--CODE
   K. COUNTRY.sub.--CODE
   L. VOX.sub.--PHONE
   M. FAX.sub.--PHONE
   N. CREATE.sub.--DATE
   O. COMMENTS In the preferred embodiment, through a communication network, the DB 400 is connected to the ORB 200 through a LAN using switched 1000BaseT/100BaseT Ethernet, and TCP/IP protocol though the invention is not so limited. As is known to persons of ordinary skill in the art, the 1000BaseT/100BaseT Ethernet is a networking link layer protocol. Further, the numbers 1000 and 100 refer to the communication link speed in megabits per second. In the preferred embodiment the CISCO Catalyst 6000, model 6509, Network Switch or equivalent hardware supports the LAN connectivity between the devices connected to it. However, DB 400 could also connect to ORB using a WAN connection shown in FIG. 8.

FIG. 6 displays the block diagram of the DataTreasury™ Encryption Subsystem (ES) 500. The ES 500 ensures a secure transaction and communication between the DataTreasury™ Application Server (AS) 300 and their client subsystems 50. Furthermore, the ES 500 ensures that all data stored is encrypted and secured against any attempts to gain unauthorized access. Encryption which protects against unauthorized access for use in the present invention is described in U.S. Pat. No. 5,910,988, U.S. Pat. No. 6,032,137, and U.S. patent application Ser. No. 09/454,492 to Ballard, entitled "Remote Image Capture with Centralized Processing and Storage", which patent is incorporated herein by this reference. The ES 500 is further capable of detecting potential tampering of documents in transit. Lastly, the ES 500 verifies the identity of the client subsystem 50 initiating the transaction. The ES 500 is created as an encryption object initiated from the AS 300.

One embodiment of the cryptography scheme in the ES 500, is implemented with a symmetric cryptography scheme. Symmetric cryptography entails the use of a single secret key for both encryption and decryption of the transmission. The client subsystem 50 and the AS 300 require the possession of the key issued to the client subsystem 50 in order to decipher transmissions. The AS 300 issues unique keys to each of their client subsystems 50.

Another embodiment of the cryptography scheme in the ES 500, is implemented with an asymmetric cryptography scheme. An asymmetric scheme utilizes a two key pair, which consists of a public key 520 and a private key 580. A public key 520 is one that is freely distributed, whereas a private key 580 is treated in a surreptitious fashion. A document that is encrypted with public key 520 may only be decrypted with the corresponding private key 580, and visa versa.

Furthermore, the integrity of the communications within the ES 500 may be ensured with the use of a digital signature. A digital signature is used to link the owner of the public key to the document; it is also capable of detecting alterations to the transmission in transit. The transmission is subjected to an encryption process, known to a person skilled in the art as hashing, and a message digest is created. The process of creating the message digest is known as the digesting process. A message digest is a unique value of fixed length dependent on the input into the digesting process transmission. Both parties need to be aware that the digesting process is utilized.

Once the user formulates the desired transmission, it is then subjected to the digesting process. Then the client subsystem 50 utilizes his public key to encrypt the message digest and the transmission, which results in a digital signature. The digital signature can be combined with the transmission, or exist as a separate entity. The AS 300 receives the transmission along with the digital signature. The digital signature is decrypted utilizing the corresponding private key to obtain a decrypted message digest. The transmission is then subjected to the digest process to obtain a message digest. Lastly, the ES 500 compares the signature message digest with the transmission message digest, if these values are equal, then the client subsystem 50 is authenticated.

Another method that may be used to ensure data transmission authenticity is the use of digital certificates 550. These digital certificates 550 certify the identity of the holder of the public key 520. The AS 300 may act as a certification authority 560. The certification authority 560 issues the digital certificates 550 to client subsystems 50. The digital certificates 550 verify that the owner of the public key 520 is also the certificate holder.

The client subsystem 50 obtains the digital certificate 550 and presents it to the application with some form of identity verification, specifically, but not exclusively biometric information, personal information, financial information. The application verifies the certificate with the certificate authority 560, and the AS 300. The digital certificate 550 which is sent to the client subsystem 510 may contain one or more of the following: the certification authority's 560 digital signature, the public key 520 of the client subsystem 510, the name of the user, the name of the certification authority 560, and the expiration date of the certificate.

Data is stored in the DB 400 in an encrypted form. After retrieval from the database the records must be decrypted before any useful operation can be performed on them. For decryption, a cryptographic key is required. The key is obtained as a result of, or in conjunction with, the authentication process using a biometric. In this way, it is possible to secure records from access from all but the authentic owner of the information.

The DataTreasury™ Repository System 100 is not so limited to the encryption and the authentication schemes. As known to persons of ordinary skill in the art, the DataTreasury™ Repository System may utilize any scheme that ensures the highest degree of security, encryption and authentication may also be implemented. See, e.g., Pleeger, "Security in Computing", Second Edition, chap. 2 to chap. 9, (Prentice Hall, 1996).

FIG. 7 displays a block diagram of the process for processing biometrics using the DataTreasury™ Biometric Subsystem (DTBS) 600. The DTBS 600 processes all biometric information in the DataTreasury™ Repository System. The DTBS 600 may make use of layered biometrics for added security. A layered biometric consists of multiple types of biometrics or multiples of the same type biometric. The biometric information may be from a fingerprint, digital voiceprint, retinal scan, DNA or some other form of biometric. The multiple biometric sources are individually processed, and a composite of the resulting elements are used for verification. The DTBS 600 extracts minutia from the fingerprint and stores them in the DB 400. The DTBS 600 further authenticates the user identity with their personal biometric. Devices for capturing biometrics which are subsequently utilized to verify the identity of a person by comparing the biometric data captured remotely with the biometric data stored for use in the present invention are described in U.S. Pat. No. 5,910,988, U.S. Pat. No. 6,032,137, and U.S. patent application Ser. No. 09/454,492 to Ballard, entitled "Remote Image Capture with Centralized Processing and Storage", which is incorporated herein by reference.

In the fingerprint biometric subsystem, a capacitive apparatus may be utilized to capture a biometric signature, preferably in the form of a raw image 605 of the fingerprint. This biometric device is connected to the client subsystem 50. The fingerprint may then be saved in an image format. It may also be compressed with a loss-less compression algorithm, and/ or converted to a more efficient image format. An apparatus stated in the U.S. Patent entitled "Capacitive Fingerprint Sensor with Adjustable Gain," 6,049,620, may be utilized.

The compressed and then encrypted image is then transferred to the DataTreasury™ Repository System. In the preferred embodiment, once the image has been received, the AS 300 begins preprocessing 610 the image. Preprocessing 610 performs basic image enhancement transformations on the image, such as the adjustment of: contrast, brightness, and scale, and additionally removes extraneous noise from the image to produce an enhanced image of the fingerprint. Preprocessing 610 can correct for differences in images due to acquisition using different sensors, as well as other variables affecting image acquisition. It is also possible to create profiles for specific devices or conditions, and apply them conditionally during preprocessing 610.

After preprocessing 610 is complete, the image is subjected to a binarization process 615. The binarization process 615 transforms the image into pixels of values either pure black or white.

Skeleton processing 617 follows binarization. The skeleton image is formed by reducing the lines representing finger ridges in the binary image to a width of 1 pixel wide. This is done to maintain the original topography and connectivity of the ridges. Skeleton postprocessing is then conducted to enhance the skeleton image by interpolating breaks in the skeleton images caused by finger pores, scars, wrinkles, and other surface imperfections in the finger. See, e.g., Jain, Halici, Hayashi, Lee, and Tsutsui, "Intelligent Biometric Techniques in Fingerprint and Face Recognition", chap. 2 and chap. 3, (CRC Press, 1999).

The image is then classified in step 630 into distinct categories to decrease retrieval time. These categories may include but are not limited to: whorls, loops, and arches. These categories are utilized to form an index of the client subsystem's 50 identity corresponding to minutia within DB 400. For instance, a process in the U.S. Patent entitled "Neural Network System for Classifying Fingerprints," U.S. Pat. No. 5,825,907 may be utilized to classify fingerprints.

The minutia points are extracted in step 650. An algorithm is utilized to obtain minutia points. If the extracted minutia points cannot be read, then in step 670 DTBS 600 utilizes a different biometric and then in step 695 repeats the comparison of biometrics. However if DTBS 600 can read the biometrics, then the extracted minutia points are compared in step 675 with the point of reference minutia points resident in DB 400. The point of reference, enrollment minutia are obtained and subsequently stored in the DB 400 during the user's registration process. If the minutia points match in step 690, a positive verification is made. However, if there is no match, then another biometric input 670 is requested, and verification fails. The other biometric may be from another type of biometric input 670, like a voiceprint or retinal print. Furthermore, it may be from another source input of the same type of biometrics. This other biometric 670 is reintroduced into the verification process 695.

FIG. 8 shows a block diagram of communication network 800 connecting client subsystems 50, hosts 70 ORB 200, and DB 400. ORB 200 may connect to other ORB 200 systems via a first local area network or LAN connection 810 which contains a network switch 812. Client subsystems 50 and hosts 70 may be connected to each other via the internet or via an Ethernet connection forming an intranet. Both client subsystems 50 and hosts 70 connect to API 80 or SOS 90 first and then to ORB 200 via a wide area network or WAN connection 820. WAN connection 820 comprises an Ethernet network 822 connected to client subsystems 50 or hosts 70 and another Ethernet network 823 connected to network switch 812. Ethernet 822 associated with client subsystems 50 connects to a WAN router 824 while Ethernet 823 associated with network switch 812 connects to WAN router 825. WAN routers 824 and 825 connect to API Gateway 80 or SOS 90 via network lines 823. API Gateway 80 or SOS 90 connects to network switch 812 which connects to ORB servers 200.

ORB 200 also connects to DB 400 via a second LAN 840. In addition DB 400 may exist as one or more servers connected to each other via a second LAN 860 containing a network switch 862. Second LAN 840 comprises an Ethernet network, for connecting to network switch 812 for ORB 200 and for connecting to network switch 862 for DB 400. Network switch 862 connects to data storage subsystems DB 400.

This invention is not so limited by the method of extracting and analyzing minutia.

For example, FIG. 9 is a flowchart depicting the general process for the central management, security, storage, biometric authentication, verification and user or initiator initiated data transactions.

Thus this process includes a first step 910 which includes capturing transactional data including an image of the biometric data, and any and all types of additional data. Next, in step 920 at least one remote location encrypts and sends this transactional data or information. In step 930, the authenticity and identity of the user is verified so that the user can access an appropriate account. In step 940, the transactional data is encrypted and decrypted upon transmission and storage and presentation to the user. In step 950 the capturing and sending of data is managed. Next, in step 960, this data is collected at a remote centralized location. In step 970, the remote centralized location manages the collecting, processing, sending and storing of this transactional data. Finally, in step 980 the encrypted transactional data and subsystem identification information is transmitted between the remote location the centralized location and other entities.

Step 910 which comprises the step of capturing transactional data may include the steps of capturing biometric data and any and all additional data; successively transforming the captured biometric data to a biometric signature, creating an encrypted compressed file identifying a location and time of the biometric data capturing; storing the tagged, encrypted compressed biometric signature file; and initiating a transaction upon the capture of a biometric.

Step 920 which includes the step of encrypting the data includes the steps of creating encryption keys to encrypt the data; and encrypting and decrypting the transactional data with encryption and decryption keys.

Steps 910 and 920 can occur at a plurality of remote locations while step 960 which includes collecting, processing, sending, and storing the encrypted transactional data at a remote centralized location can occur at a plurality of independent locations. Step 960 may also include the steps of transmitting, from remote locations, transactional data with servers at a centralized location; storing specific types of encrypted transactional data at distinct independent remote locations in a memory hierarchy, wherein the storing of this data maintains recently accessed encrypted transactional data in a primary memory and other encrypted transactional data in a secondary memory; and dynamically assigning the servers at the central location to receive portions of the transactional data for balancing FIG. 10 is a flowchart depicting the operation of one embodiment of the present invention.

In step 1010, a registered user who desires a service from the DataTreasury™ Repository System initiates a transaction. The user begins the transaction by inputting a biometric. Client subsystem 50 transactions are associated with unique stubs.

In step 1020, a client subsystem 50 stub resides at the terminal; and the stub forwards the transaction via frame relay. All transmissions sent to the ORB 200 are encrypted.

In step 1030, the crypto object verifies that the stub is a valid DataTreasury™ Repository issuer. The crypto subsystem verifies secure communication between the stub and skeleton using but not limited to socket level cryptography. Lastly, the crypto object decrypts the messages.

In step 1040, the skeletons specify all objects to be created to accomplish the desired task.

In step 1050, the business application objects associated with the identified skeletons are invoked by the ORB 200. The AS 300 instantiates the business objects, to correspond with the skeletons.

In step 1060, the business application object instantiates a biometric verification object to ensure the identification of the user with the corresponding level of confidence.

In step 1070, the raw fingerprint is grafted on a vector grid to extract invariant characteristics, such as minutia points. The minutia extraction is accomplished through an algorithm.

In step 1080, the ORB 200 initiates a query of the DB 400, amongst the enrolled user biometrics store, for minutia matches. This can be but not limited to a one-to-one search when there exists no personal identifier. When there is such a personal identifier available, the parameters of the one-to-many search are dramatically reduced. Lastly, the minutia points are matched.

In step 1085, the AS 300 business objects perform the client subsystem 50 requested operation on the user account corresponding to the user's biometric.

In step 1090, the encrypted response/results are returned to the client subsystem 50.

FIG. 11 is a second embodiment of the flowchart shown in FIG. 9. In this case, many of the steps shown in FIG. 9 are shown. For example, in step 910 transactional data is captured, while in step 920, this data is encrypted and sent. However, instead of verifying the authenticity of the user in step 930, the system verifies the identity of the user in step 931. This step involves a one to many search wherein the system searches for the user's identity which has been previously stored in DB 400. Once this identity has been matched, in step 933 the system creates a pseudo identifier which identifies the user via a limited information tag such as a set of demographic information. In step 935, this pseudo identifier is stored in a pseudo identifier database in DB 400. Next, in step 937, the system sets a security filter so that this pseudo identifier and cannot be used to determine the true identity of the user.

Once the user's pseudo identification has been established, the system proceeds through steps 940-980 as in FIG. 9. This type of process shown in FIG. 11 can be used especially for voting or health care where the identity of the user must remain secret. If this process is used for voting then step 910, which is the step of capturing transactional data, includes capturing voting information such as the votes cast by each user. If this process is used for health care, then step 910 involves capturing the health history of the user, the health care insurance information of the user, or any health related tests for the user such as blood tests or urine tests.

While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A system to provide a centralized, secured and authenticated storage of information comprising:
a client subsystem to receive and send transactional data comprising:
a biometric processing client subsystem for capturing biometric data; and
a data capturing device to capture additional data;
a remote data management subsystem for receiving the transactional data from the client subsystem;
a remote data storage subsystem, connected to the remote data management subsystem over a communication network, to store transactional data at the direction of the remote data management subsystem;
a data processing subsystem, connected to the remote data management subsystem over the communication network, for processing transactions initiated by the remote data management subsystem, on encrypted subsystem identification information and encrypted transactional data provided by the client subsystem to the remote data management subsystem;

a biometric subsystem instantiated by the data processing subsystem to verify the identity of a user of the client subsystem, from the captured biometric data in the transactional data; and an encryption subsystem instantiated by the data processing subsystem for ensuring the security of the transactional data.

2. The system, as in claim 1, wherein the client subsystem further comprises a biometric device for capturing biometric data;

and wherein the client subsystem successively transforms the captured biometric data to an encrypted image format, a compressed image file, data transmission identifying a location and time of the transactional data capture, into a transaction stub for interfacing to the data management subsystem.

3. The system, as in claim 1, wherein said data management subsystem comprises:

a server providing for resources for processing, and managing the storage of transactional data from said at least one remote client subsystem;

a report generator for generating reports from the transactional data;

a transaction processing architecture for dynamically administrating a series of intelligent data management services among the server; and a memory hierarchy.

4. The system, as in claim 3, wherein said processing of transactional data by said data processing subsystem occurs after said transactional data is decrypted by said encryption subsystem.

5. The system, as in claim 3, wherein said transactional data is re-encrypted by said encryption subsystem after said data processing and said data is then stored in said data storage subsystem.

6. The system, as in claim 3, wherein the transaction processing architecture contains a CORBA object request broker (ORB) architecture that apportions and balances transactional resources among at least one server.

7. The system, as in claim 3, wherein the server also receives encrypted transactional data from the client subsystem, and said data storage subsystem stores the encrypted transactional data;

wherein the biometric subsystem reduces the biometric data to a series of invariant characteristics through the use of an algorithm;

wherein the server utilizes a biometric search algorithm to facilitate a one to many search to identify a corresponding data storage subsystem resident enrolled biometric to verify the user;

and wherein the server identifies an appropriate user account corresponding to a verified user biometric.

8. A method for central management, security, storage, biometric authentication, verification, and initiation of data transactions comprising the steps of:

capturing transactional data including an image of the biometric data of a user and additional data, at a remote location, and encrypting the transactional data, and sending encrypted transactional data to an object request broker;

verifying the authenticity of the user for access to an appropriate account by a sequence of operations comprising:

operating the object request broker to cause an application server to instantiate a biometric verification object;

operating the biometric verification object to extract characteristics from the biometric data; and operating the object request broker to query a database for stored matches to the biometric data based on the extracted characteristics; and operating the object request broker to cause an application server to instantiate an encryption object for encrypting the transactional data for transmissions and storage in a database in a data storage subsystem, and for decrypting the transactional data upon processing for presentation to the authorized user.

9. The method as in claim 8, wherein said capturing the transactional data which includes biometric data step comprises:

capturing biometric data;

successively transforming the captured biometric data to a biometric signature;

creating an encrypted, compressed file identifying a location and time of the biometric data capturing;

storing the tagged, encrypted, compressed biometric signature file; and initiating a transaction upon the capture of a biometric.

10. The method, as in claim 8, wherein said biometric capturing and sending step is performed at a plurality of remote locations.

11. The method as in claim 8, further comprising the steps of:

creating a pseudo identifier for said user;

storing the pseudo identifier in a pseudo identifier database; and setting a security filter so that said pseudo identifier and said pseudo identifier database do not reveal said user's original identity; and then using the pseudo identifier, executing the encryption object to decrypt transactional data for presentation to the authorized user.

12. The method as in claim 11 wherein said pseudo identifier is a demographic tag that can be set to reveal information relating to the user.

13. The method as in claim 11 wherein said step of creating a pseudo identifier occurs after said step of verifying the identity of said user.

14. The method as in claim 11 further comprising the step of storing said pseudo identifier in a pseudo identifier database.

15. The method, as in claim 10, further comprising:

operating the object request broker to store specific types of encrypted transactional data at distinct independent remote locations in a memory hierarchy of the data storage subsystem, said storing maintaining recently accessed encrypted transactional data in a primary memory and other encrypted transactional data in a secondary memory;

operating the object request broker to dynamically assigning the assign servers at a central location to receive portions of the transactional data for balancing the transactional data among a plurality of servers; and generating reports from the transactional data and providing data to software applications executed by the application server.

* * * * *